United States Patent
Fujiwara et al.

(10) Patent No.: US 9,041,331 B2
(45) Date of Patent: May 26, 2015

(54) MOTOR CONTROLLING APPARATUS

(75) Inventors: Kengo Fujiwara, Ebina (JP); Ken Ito, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 190 days.

(21) Appl. No.: 13/816,884

(22) PCT Filed: Sep. 12, 2011

(86) PCT No.: PCT/IB2011/002118
§ 371 (c)(1),
(2), (4) Date: Feb. 13, 2013

(87) PCT Pub. No.: WO2012/042325
PCT Pub. Date: Apr. 5, 2012

(65) Prior Publication Data
US 2013/0141028 A1   Jun. 6, 2013

(30) Foreign Application Priority Data

Sep. 29, 2010   (JP) .................................. 2010-218715

(51) Int. Cl.
*H02K 17/32* (2006.01)
*H02P 31/00* (2006.01)
(Continued)

(52) U.S. Cl.
CPC ................. *H02P 31/00* (2013.01); *B60L 15/20* (2013.01); *B60W 10/08* (2013.01); *B60W 30/20* (2013.01); *Y02T 10/7275* (2013.01)

(58) Field of Classification Search
USPC .......... 318/434, 400.07, 400.15, 400.23, 432; 477/3, 111
See application file for complete search history.

(56) References Cited

U.S. PATENT DOCUMENTS 6,756,758 B2 *   6/2004   Karikomi et al. ............. 318/434
2004/0198551 A1 *  10/2004   Joe et al. ............................ 477/3
(Continued)

FOREIGN PATENT DOCUMENTS

CN   102164814 A   8/2011
JP   11-18210 A   1/1999
(Continued)

OTHER PUBLICATIONS

An English translation of the Japanese Office Action for the corresponding Japanese patent application No. 2010-218715 issued on Apr. 22, 2014.
An English translation of the Chinese Office Action for the corresponding Chinese patent application No. 201180044549.5 issued on Nov. 3, 2014.

*Primary Examiner* — Kawing Chan
*Assistant Examiner* — Jorge L Carrasquillo
(74) *Attorney, Agent, or Firm* — Global IP Counselors, LLP

(57) ABSTRACT

A motor controlling apparatus includes a first target torque value calculator, a frequency detector, a second target torque value calculator, a torque command value calculator, a torque limiter, and a controller. The first target torque value calculator calculates a first target torque value, which is a target value of an output torque of a motor. The frequency detector detects a motor rotational frequency. The second target torque value calculator calculates a second target torque value based on the rotational frequency. The torque command value calculator mathematically combines (e.g., adds) the first and target torque values to calculate a torque command value. The torque limiter sets the signs of the first target torque value and the torque command value to be equal to limit the torque command value according to the first target torque value. The controller controls the motor based on the limited torque command value.

5 Claims, 9 Drawing Sheets

(51) Int. Cl.
*B60L 15/20* (2006.01)
*B60W 10/08* (2006.01)
*B60W 30/20* (2006.01)

(56) References Cited

U.S. PATENT DOCUMENTS

| | | |
|---|---|---|
| 2009/0090572 A1 | 4/2009 | Huber et al. |
| 2009/0181823 A1* | 7/2009 | Moriya et al. ............... 477/111 |
| 2009/0259391 A1* | 10/2009 | Ando et al. .................. 701/113 |

| | | |
|---|---|---|
| 2011/0178667 A1 | 7/2011 | Senba et al. |

FOREIGN PATENT DOCUMENTS

| | | | |
|---|---|---|---|
| JP | 2003-9566 A | | 1/2003 |
| JP | 2005-269834 A | | 9/2005 |
| JP | 2005269834 A | * | 9/2005 |
| JP | 2007-210359 A | | 8/2007 |
| JP | 2007210359 A | * | 8/2007 |
| WO | 2006093338 A1 | | 9/2006 |

* cited by examiner

MOTOR CONTROLLING APPARATUS

CROSS-REFERENCE TO RELATED APPLICATIONS

This application is a U.S. National stage of International Application No. PCT/IB2011/002118, filed Sep. 12, 2011. This application claims priority to Japanese Patent Application No. 2010-218715, filed on Sep. 29, 2010. The entire disclosure of Japanese Patent Application No. 2010-218715 is hereby incorporated herein by reference.

BACKGROUND

1. Field of the Invention

The present invention generally relates to a motor controlling apparatus. More particularly, the present invention relates to a motor controlling apparatus and method that can reduce the effect of disturbances to minimize any anomalous sound made by gears or other components associated with the motor.

2. Background Information

An apparatus for controlling damping in a vehicle is described, for example, in Japanese Laid-Open Patent Application No. 2005-269834. The apparatus includes a rotational speed detector that detects a rotational speed of a motor, and a first target torque calculator that calculates a first target torque value based on vehicle information. The apparatus further includes a first corrected target torque value calculator that filters the first target torque value and calculates a first corrected target torque value, and a motor rotational speed estimator that filters a fourth target torque value and obtains an estimated value for motor rotational speed. The apparatus also includes second target torque value calculator that passes the deviation between a rotational speed estimated by the motor rotational speed estimator and a rotational speed detected by the rotational speed detector through a filter, and thereby calculates a second target torque value. The apparatus further includes a third target torque value calculator which limits the second target torque value to be within a predetermined torque range to calculate a third target torque value, and a fourth target torque value calculator that adds the first corrected target torque value and the second target torque value to calculate a fourth target torque value. The apparatus also includes a torque command value calculator that adds the first corrected target torque value and the third target torque value to calculate a torque command value, and a motor controller that controls the motor based on a torque command value.

SUMMARY

However, it has been discovered that disturbances such as irregularities in the road surface on which the vehicle travels may cause fluctuations in the third target torque value. As a result, the positive or negative sign of the torque command value may be reversed. Therefore, the gears of a transmission, for example, may emit anomalous sounds.

A motor controlling apparatus according to a disclosed embodiment is provided to resolve the aforesaid problems. One object of a motor controlling apparatus according to a disclosed embodiment is to prevent the positive or negative sign of a torque command value from being reversed due to disturbances and to minimize any anomalous sound made by gears or other components. The disclosed embodiment thus applies the same sign to the first target torque value and to the torque command value, and limits the torque command value according to the first target torque value to achieve this object.

In view of the state of the known technology, one aspect of the present disclosure is to provide a motor controlling apparatus comprising a first target torque value calculator, a frequency detector, a second target torque value calculator, a torque command value calculator, a torque limiter, and a controller. The first target torque value calculator is configured to calculate a first target torque value based on vehicle information, with the first target torque value being a target value of an output torque of a motor. The frequency detector is configured to detect a rotational frequency of the motor. The second target torque value calculator is configured to calculate a second target torque value based on the rotational frequency detected by the frequency detector. The torque command value calculator is configured to mathematically combine the first target torque value and the second target torque value to calculate a torque command value. The torque limiter is configured to set a sign of the first target torque value and a sign of the torque command value to be equal to limit the torque command value according to the first target torque value. The controller is configured to control the motor based on the torque command value as limited by the torque limiter.

BRIEF DESCRIPTION OF THE DRAWINGS

Referring now to the attached drawings which form a part of this original disclosure.

DETAILED DESCRIPTION OF EMBODIMENTS

Figure 1:
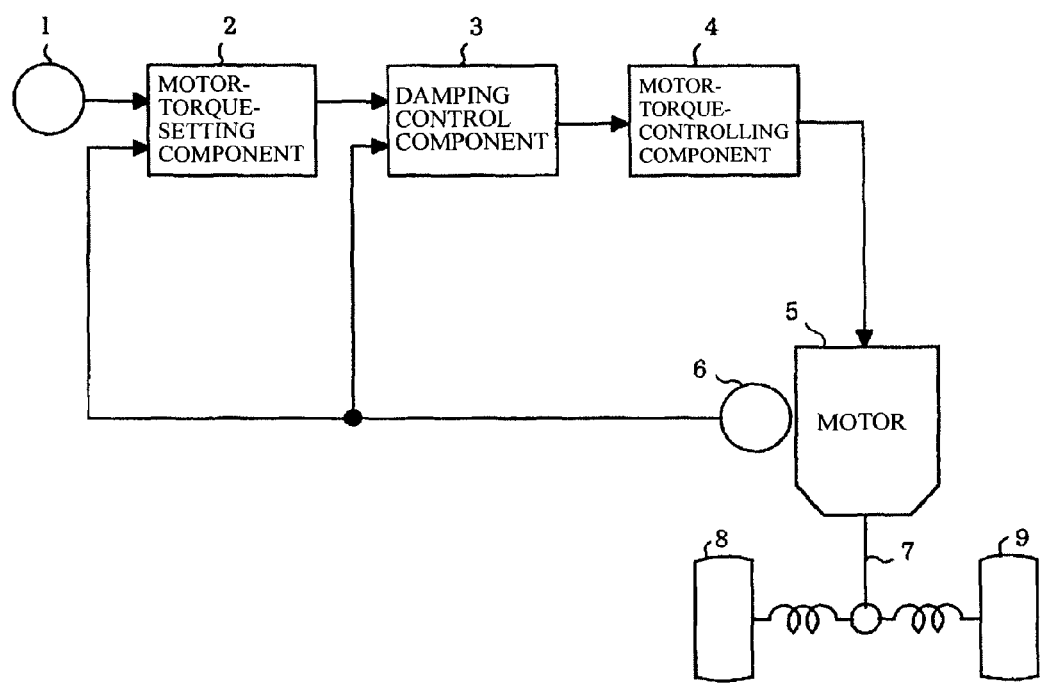
FIG. 1 is a block diagram illustrating a vehicle that includes a motor controlling apparatus, which can also be referred to as a drive/torsional vibration system, according to a disclosed embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 1, a vehicle including a motor controlling apparatus is illustrated in accordance with a first embodiment. As shown in FIG. 1, the vehicle includes an accelerator position sensor 1, a motor-torque-setting component 2, a damping control component 3, a motor-torque-controlling component 4, a motor 5, a motor-rotational-angle sensor 6, a drive shaft 7 and a pair of wheels 8 and 9. In the example described below, the vehicle is an electric vehicle. However, the motor controlling apparatus of the illustrated embodiments can also be used in, for example, hybrid vehicles (HEVs) or other vehicles besides electric vehicles. Also, the vehicle can be an automobile, a car, a truck, an SUV, a van or any other suitable type of vehicle.

As understood in the art, the accelerator position sensor 1 detects the amount by which a driver operates the accelerator. The motor-torque-setting component 2 (first target torque value calculator) calculates and sets a target value (first target torque value ($T_1$)) for the motor torque based on the accelerator position, which is detected by the accelerator position sensor 1 as vehicle information, and the motor rotational speed, which is detected by the motor-rotational-angle sensor 6 (frequency detector). The accelerator position and the motor rotational speed are used as indices in the motor-torque-setting component 2, in which is stored in advance a map for making correspondences with the target value for the output torque of the motor 5. The motor-torque-setting component 2 makes reference from the accelerator position and the motor rotational speed to the map and calculates the target value. The target value is then passed through a filter having Gm(s)/Gp(s) transmission characteristics, and the first target torque value is computed. The motor-torque-setting component 2 may also use a torque command value input from an external source, instead of the accelerator position and the motor rotational speed, to compute the first target torque value ($T_1$). In this example, Gm(s) is a model (ideal model) that represents a response target for the vehicle-input torque and the motor rotational speed, and Gp(s) is a model that represents the transmission characteristics of the vehicle-input torque and the motor rotational speed.

The damping control component 3 (torque command value calculator) calculates a torque command value (T*) based on the first target torque value ($T_1$) and the motor rotational speed, and outputs the torque command value (T*) to the motor-torque-controlling component 4 (controller). An example of a method according to which the damping control component 3 calculates the torque command value (T*) is described below.

The motor-torque-controlling component 4 exerts control so that the output torque of the motor 5 is brought into accordance with or is made to follow the torque command value (T*) output from the damping control component 3. For example, the motor-torque-controlling component 4 generates a PWM signal based on the torque command value (T*) and outputs the PWM signal to a driving circuit for an inverter that drives the motor 5. Therefore, the motor 5 is controlled.

The motor 5 in this example is a permanent-magnet motor powered by three-phase alternating current. The motor 5 acts as a motive drive source that is coupled to the drive shaft 7 of the electric vehicle and causes the wheels 8 and 9 to rotate via the drive shaft 7.

Figure 2:
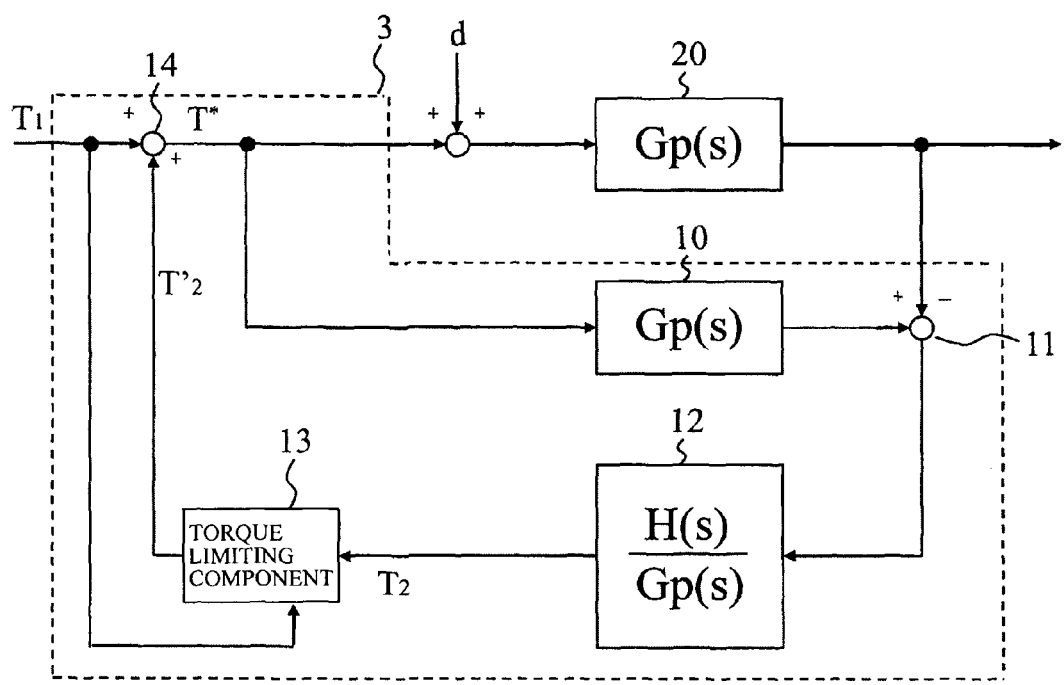
FIG. 2 is a block diagram illustrating an example of the damping control component and the control block for the motor shown in FIG. 1.

The specific configuration of the damping control component 3 will be described next using FIG. 2. FIG. 2 is a block diagram illustrating an example of the damping control component 3 and a control block 20 for the motor 5.

The damping control component 3 in this example includes a control block 10, a subtractor 11, a control block 12, a torque-limiting component 13, and an adder 14. The control block 20 is the control block that represents the motor 5 and is illustrated as a control block having Gp(s) transmission characteristics. A value resulting from adding the torque command value (T*), which is added by the adder 14, and a disturbance torque (d), which is input from an external source, is input to the control block 20.

It should be understood that the motor-torque-setting component 2, the damping control component 3, the motor-torque-controlling component 4 and any other component discussed herein having processing or control capabilities can include a microprocessor, and can also each include or share other conventional components such as an input interface circuit, an output interface circuit, and storage devices such as a ROM (Read Only Memory) device and a RAM (Random Access Memory) device. The RAM and ROM store processing results and control programs that are run by the motor-torque-setting component 2, the damping control component 3, the motor-torque-controlling component 4 and any other such component. Furthermore, the motor-torque-setting component 2, the damping control component 3, the motor-torque-controlling component 4 and any other such component discussed herein are operatively coupled to the components of the vehicle in a conventional manner. It will be apparent to those skilled in the art from this disclosure that the precise structure and algorithms for the motor-torque-setting component 2, the damping control component 3, the motor-torque-controlling component 4 and any other processor or controller discussed herein can be any combination of hardware and software that will carry out the functions of the embodiments discussed herein.

As further shown, the control block 10 passes the torque command value (T*) through a filter having a Gp(s) transmission function and estimates the rotational speed of the motor 5. The torque command value is output from the adder 14, which is described hereinafter. The subtractor 11 calculates the deviation between the estimated rotational speed, which is output from the control block 10, and the rotational speed of the motor 5, which is output from the control block 20, and outputs a result of the calculation to the control block 12. The control block 12 (second target torque value calculator) includes a filter having H(s)/Gp(s) transmission characteristics, passes the deviation output from the subtractor 11 through the filter, and outputs a second target torque value ($T_2$) to the torque-limiting component 13 (torque limiter). H(s) is a model that represents the transmission characteristics of a band-pass filter.

Figure 3:
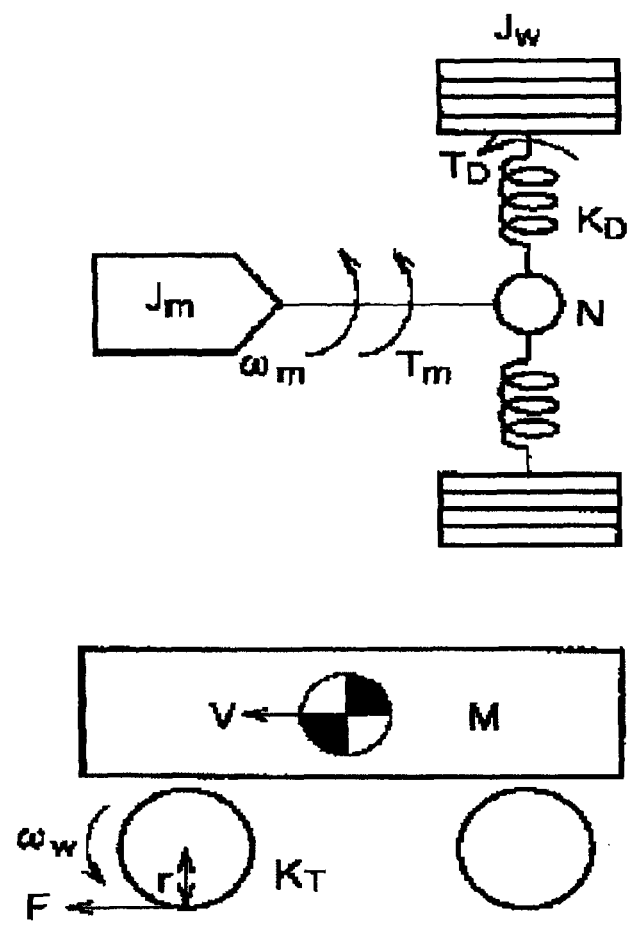
FIG. 3 is an illustrative diagram that shows example of equations pertaining to motion for the apparatus shown in FIG. 1.

The Gp(s) model for the transmission characteristics of the vehicle-input torque and the motor rotational speed will now be described with regard to FIG. 3. FIG. 3 is an illustrative diagram that shows an example of the equations (1) through (5) pertaining to motion for the apparatus shown in FIG. 1:

$$J_m \cdot \frac{d}{dt}\omega_m = T_m - \frac{T_D}{N} \tag{1}$$

$$2J_w \cdot \frac{d}{dt}\omega_w = T_D - rF \tag{2}$$

$$M \cdot \frac{d}{dt}v = F \tag{3}$$

$$T_D = K_D \cdot \int \left(\frac{\omega_m}{N} - \omega_w\right) dt \quad (4)$$

$$F = K_T \cdot (r \cdot \omega_w - v) \quad (5)$$

where
- $J_m$: Motor inertia;
- $J_w$: Drive-wheel inertia;
- M: Vehicle mass;
- $K_D$: Torsional rigidity of the drive system;
- $K_T$: Coefficient relating to the tires and the friction of the road surface;
- N: Overall gear ratio;
- r: Tire radius under load;
- $\omega_m$: Motor angular speed;
- $T_m$: Motor torque;
- $T_D$: Drive-wheel torque;
- F: Force acting on vehicle;
- v: Vehicle speed; and
- $\omega_w$: Drive-wheel angular speed.

FIG. 3 can be used as a guide for the equations pertaining to motion as discussed above.

When the transmission characteristics Gp(s) from the motor torque to the motor rotational frequency are obtained based on Equations (1) through (5) pertaining to motion, the result can be represented by Equations (6) through (14) below:

$$G_p(s) = \frac{b_3 s^3 + b_2 s^2 + b_1 s + b_0}{s(a_4 s^3 + a_3 s^2 + a_2 s + a_1)} \quad (6)$$

$$a_4 = 2 J_m J_w M \quad (7)$$

$$a_3 = J_m (2 J_w + M r^2) K_T \quad (8)$$

$$a_2 = (J_m + 2 J_w / N^2) M K_D \quad (9)$$

$$a_1 = (J_m + 2 J_w / N^2 + M r^2 / N^2) K_D K_T \quad (10)$$

$$b_3 = 2 J_w M \quad (11)$$

$$b_2 = (2 J_w + M r^2) K_T \quad (12)$$

$$b_1 = M K_D \quad (13)$$

$$b_0 = K_D K_T. \quad (14)$$

A study of the poles and zero-points of the transmission function represented by Equation (6) above shows that the corresponding individual poles and zero-points are extremely close to each other in value. This phenomenon corresponds to the fact that $\alpha$ and $\beta$ of Equation (15) below are extremely close to each other in value.

$$G_p(s) = \frac{(s+\beta)(b_2' s^2 + b_1' s + b_0')}{s(s+\alpha)(a_3' s^2 + a_2' s + a_1')}. \quad (15)$$

Therefore, performing a pole-zero cancellation in Equation (15), which makes the approximation that $\alpha=\beta$, allows the (second-order)/(third-order) transmission characteristics Gp(s) to be configured as represented by Equation (16) below:

$$G_p(s) = \frac{b_2' s^2 + b_1' s + b_0'}{s(a_3' s^2 + a_2' s + a_1')}. \quad (16)$$

In order to instantiate Equation (16) above using microcomputer processing, z-transformation and discretization, for example, can be performed using Equation (17):

$$s = \frac{2}{T} \cdot \frac{1 - z^{-1}}{1 + z^{-1}} \quad (17)$$

where "T" represents the sampling period.

Figure 4:
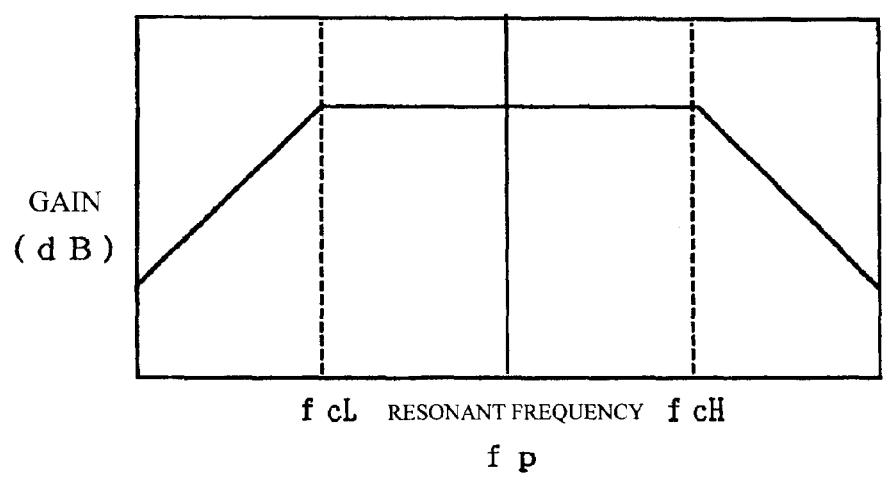
FIG. 4 is a graph that shows an example of filtering characteristics of the band-pass filter H(s) shown in FIG. 2.

The model H(s) for transmission characteristics that represent a band-pass filter will be described next with regard to FIG. 4. H(s) is a band-pass filter and therefore acts as a feedback element for reducing oscillations. FIG. 4 is a graph that shows the filtering characteristics of the band-pass filter H(s). As shown in FIG. 4, in the band-pass filter H(s), the decay characteristics of the low-pass side and the high-pass side are in accordance with each other, and a torsional resonant frequency (fp) of the drive system is set to be the center of the passband on a logarithmic axis (log scale). When, for example, H(s) is configured as a first-order low-pass filter and a high-pass filter, H(s) can be represented by Equation (18) below, where the torsional angular resonance frequency of Gp(s) is $\omega p$ $$H(s) = k \cdot \frac{\omega_p}{s + \omega_p} \cdot \frac{s}{s + \omega_p}. \quad (18)$$

Figure 5:
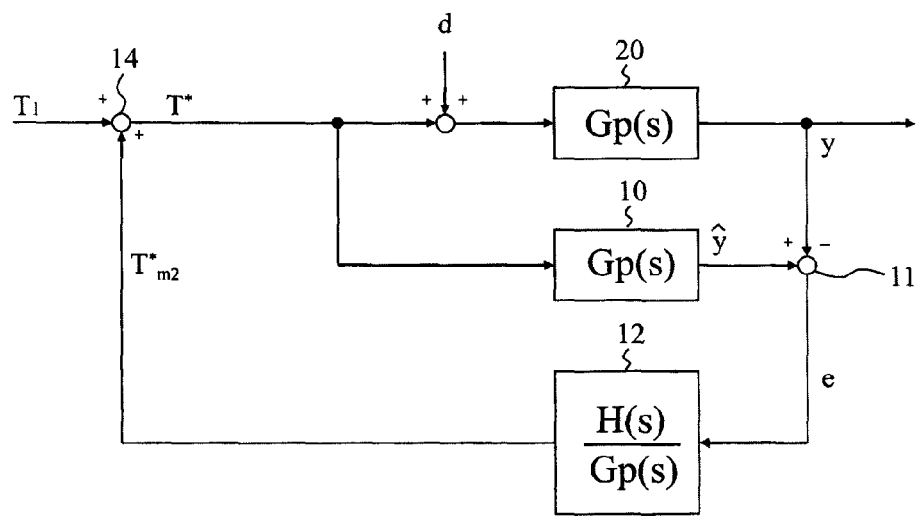
FIG. 5 is a block diagram that is a simplified version of the block diagram shown in FIG. 2.

In Equation (18), a value "k" at which the damping effect is highest is obtained. The block diagram shown in FIG. 5 will be used to simplify the description. That is, FIG. 5 is a simplified version of the block diagram shown in FIG. 2 that shows the motor controlling apparatus. In block diagram shown in FIG. 5, the following Equations (19) through (22) follow when the first target torque value $T_1$ is 0. Also, Laplace operators are omitted from the descriptions, and $T_{m2}^*$ represents the second target torque value that is output from the control block 12.

$$y = Gp(T^* + d) \quad (19)$$

$$y^\wedge = Gp \cdot T^* \quad (20)$$

$$e = y^\wedge - y = -Gp \cdot d \quad (21)$$

$$T_1 = T_{m2}^* = e \cdot H / Gp = -H \cdot d \quad (22)$$

When Equation (22) is substituted into Equation (19), the response in motor rotational speed with respect to the disturbance torque d can be represented by Equation (23).

$$Y = Gp(1 - H) d \quad (23)$$

Equation (24) results when Equations (17) and (18) are substituted into the transmission characteristics Gp(1−H) from d to y in Equation (23).

$$Gp(1-H) = [Bp(s)/s(s2 + 2\xi p\omega ps + \omega p2)] \cdot \quad (24)$$
$$[1 - k \cdot \{\omega p/(s + \omega p)\} \cdot [s/(s + \omega p)\}]$$
$$= [Bp(s)\{s2 + (2-k)\omega ps + \omega p2\}]/$$
$$[s(s2 + 2\xi p\omega ps + \omega p2)(s2 + 2\omega ps + \omega p2)].$$

When the damping effect is high, oscillation is not caused by the disturbance torque d. Therefore, if 2−k=2εp, then the numerator and denominator in Equation (24) are subject to pole-zero cancellation. Equation (25) and transmission characteristics in which oscillation does not therefore result as follows:

$$Gp(1-H)=Bp(s)/[s(s2+2\omega ps+\omega p2)] \quad (25).$$

According to the above, the value "k" at which the damping effect is highest can be represented by Equation (26) below:

$$k=2(1-\xi p) \quad (26).$$

When Equation (26) is substituted into Equation (18), H(s) can be represented by Equation (27):

$$H(s)=2(1-\xi p)\omega ps/(s2+2\omega ps+\omega p2) \quad (27).$$

Returning to FIG. 2, the torque-limiting component 13 places a limit on the second target torque value ($T_2$) according to the first target torque value ($T_1$), and outputs the limited second target torque value ($T'_2$) to the adder 14. The adder 14 adds the first target torque value ($T_1$) and the second target torque value ($T'_2$) to compute the torque command value ($T^*$), and outputs the torque command value ($T^*$) to the control block 10 and the control block 20. The torque-limiting component 13 places a limit on the second target torque value ($T_2$) so that the sign of the first target torque value ($T_1$) and the sign of the torque command value ($T^*$) output from the adder 14 are not reversed with respect to one another. In other words, when the sign of the second target torque value ($T_2$) is opposite from the sign of the first target torque value ($T_1$), and the absolute value of the second target torque value ($T_2$) is larger than the absolute value of the first target torque value ($T_1$), the sign of the torque command value ($T^*$) that results from adding the first target torque value ($T_1$) and the second target torque value ($T_2$) will be opposite from the first target torque value ($T_1$). At such times, the torque-limiting component 13 of the illustrated embodiment will cause the absolute value of the second target torque value ($T_2$) to be smaller than absolute value of the first target torque value ($T_1$). Thus, a limit is placed on the second target torque value ($T_2$), and the second target torque value ($T'_2$) is output. Since a limit is placed on the second target torque value ($T_2$), a limit is placed on the torque command value ($T^*$), and control is exerted so that the sign of the first target torque value ($T_1$) and the sign of the torque command value ($T^*$) are the same.

Figure 6:
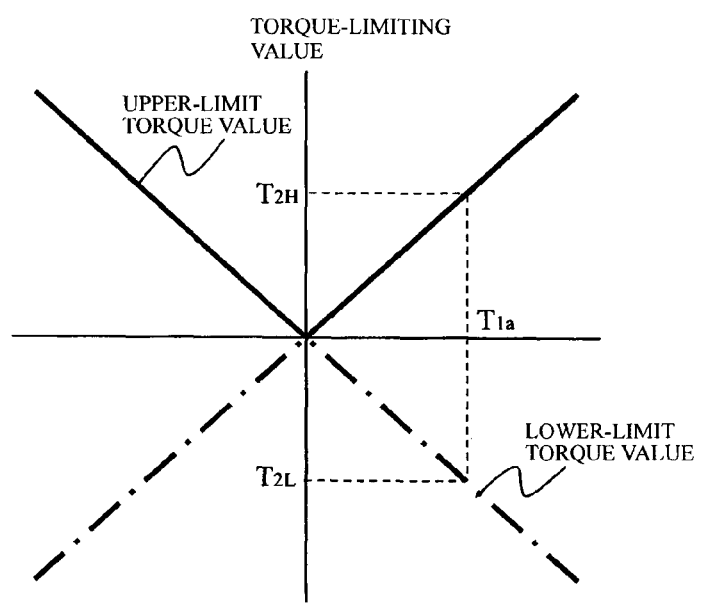
FIG. 6 is a graph illustrating an example of limited torque values with respect to the first target torque values for the components of the motor as shown in FIG. 2.

Specifically, the torque-limiting component 13 places a limit on the second target torque value ($T_2$) as shown in FIG. 6. FIG. 6 is a graph that shows limited torque values with respect to the first target torque values ($T_1$). The solid line represents the upper-limit values, and the dotted-dashed line represents the lower-limit values.

As shown in FIG. 6, the upper-limit value is set to the absolute value of the first target torque value ($T_1$), and the lower-limit value is set to a value having a sign reversed from the absolute value of the first target torque value ($T_1$). The torque-limiting component 13 sets the positive of the absolute value of the first target torque value ($T_1$) as the upper-limit value, and sets the negative of the absolute value of the first target torque value ($T_1$) as the lower-limit value according to the first target torque value ($T_1$). When, for example, the first target torque value ($T_1$) is $T_{1a}$, an upper-limit value ($T_{2H}$) of the limited torque values is the positive of the absolute value of the $T_{1a}$ (+|$T_{1a}$|), and a lower-limit value ($T_{2L}$) of the limited torque values is the negative of the absolute value of $T_{1a}$ (−|$T_{1a}$|).

The torque-limiting component 13 compares the second target torque value ($T_2$) and the upper- and lower-limit values. When the second target torque value ($T_2$) is outside the range from the upper-limit value to the lower-limit value of the limited torque values, the torque-limiting component 13 places a limit on the second target torque value ($T_2$) so that the positive of the second target torque value ($T_2$) is the upper-limit value or the negative of the second target torque value is the lower-limit value, and outputs the second target torque value ($T'_2$). On the other hand, when the motor-torque-setting component 2 is inside the range from the upper-limit value to the lower-limit value of the limited torque values, a limit is not placed on the second target torque value ($T_2$), and the second target torque value ($T_2$) is output as the second target torque value ($T'_2$). The difference between the first target torque value ($T_1$) and the second target torque value ($T_2$) in the adder 14 will therefore not be greater than zero. Accordingly, the orientation of the torque of the torque command value ($T^*$) is not reversed with respect to the first target torque value ($T_1$), and the orientation of the torque of the torque command value ($T^*$) is in the same direction as the orientation of the torque of the first target torque value ($T_1$).

Figure 7A:
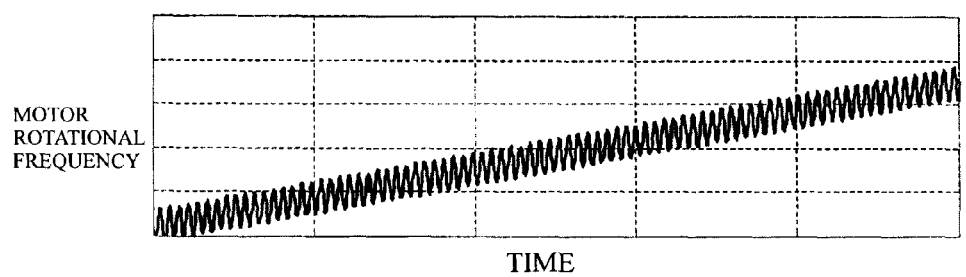
FIG. 7A is a graph that shows an example of a shift in the motor rotational frequency (motor rotational speed) over time when the torque-limiting component as shown in FIG. 2 is not provided in the motor controlling apparatus.
Figure 7B:
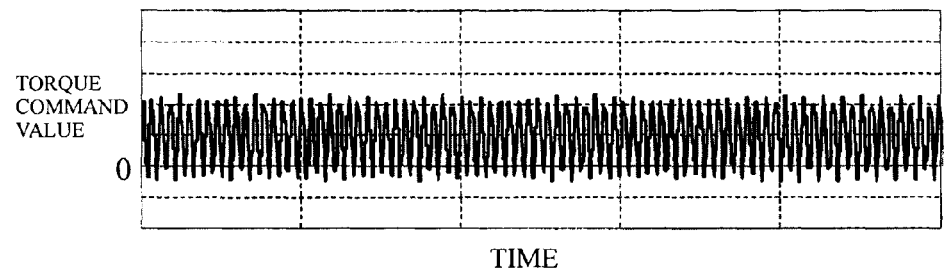
FIG. 7B is a graph that shows an example of the shift in the torque command value (T*) over time when the torque-limiting component as shown in FIG. 2 is not provided in the motor controlling apparatus.
Figure 8A:
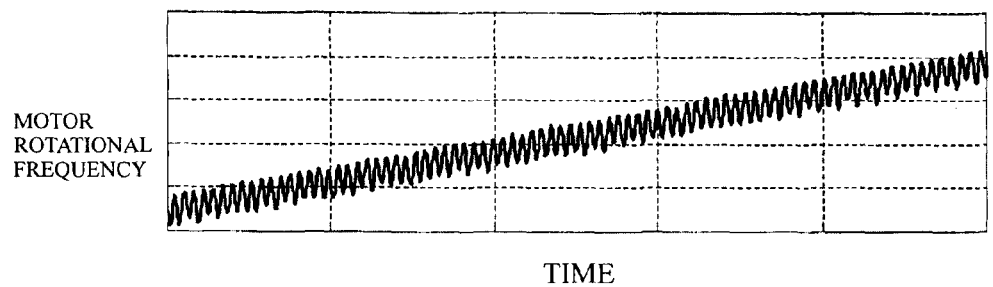
FIG. 8A is a graph that shows an example of the shift in the motor rotational frequency (motor rotational speed) over time when the torque-limiting component as shown in FIG. 2 is provided in the motor controlling apparatus.
Figure 8B:
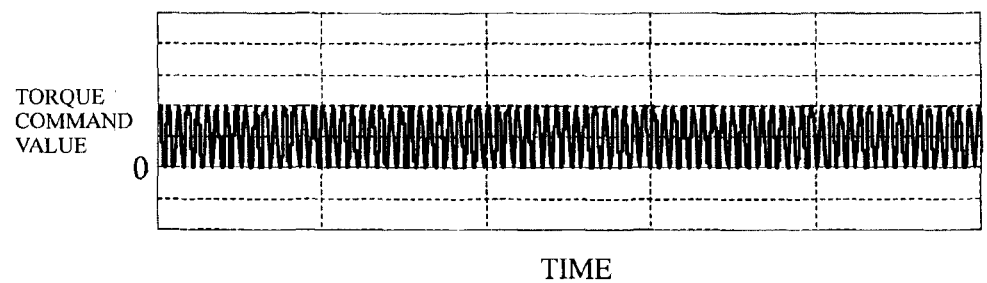
FIG. 8B is a graph that shows an example of the shift in the torque command value (T*) over time when the torque-limiting component as shown in FIG. 2 is provided in the motor controlling apparatus.

The torque command value ($T^*$) in the illustrated embodiment will now be described with regard to FIGS. 7A, 7B, 8A and 8B. FIGS. 7A and 8A illustrate an example of the shift over time in the motor rotational frequency (motor rotational speed) detected by the rotational-angle sensor 6, and FIGS. 7B and 8B illustrate an example of the shift in the torque command value ($T^*$) over time, when oscillatory errors are present in the detected value of the motor-rotational-angle sensor 6. In particular, FIGS. 7A and 7B illustrate examples of a shift in the motor rotational frequency and the torque command value ($T^*$), respectively, over time when the torque-limiting component 13 according to the illustrated embodiment is not provided in the motor controlling apparatus. FIGS. 8A and 8B illustrate examples of the shift in the motor rotational frequency and the torque command value ($T^*$), respectively, over time when the torque-limiting component 13 according to the illustrated embodiment is used. The oscillatory error in this case results from angular detection error of a resolver used in the rotational-angle sensor 6. The angle detected by the resolver is transformed, and the rotational speed is detected, whereby an error corresponding to this oscillatory error is produced.

When the torque-limiting component 13 is not provided, as shown in FIG. 7B, the torque command value ($T^*$) oscillates up and down across the zero-torque line, and the positive or negative sign of the torque command value ($T^*$) is reversed. The contact direction of the gears of the transmission (not shown) coupled to the drive shaft 7 is therefore not constant, and an anomalous sound (e.g., a grinding noise) is produced. On the other hand, as shown in FIG. 8B, the torque command value ($T^*$) oscillates in a region above zero torque, and the positive or negative sign of the torque command value ($T^*$) is not reversed in the illustrated embodiment. Accordingly, the contact direction of the gears of the transmission is therefore constant, and anomalous sounds are minimized. Also, the lower-limit value and the upper-limit value are limited by the operations of the illustrated embodiment. Therefore, the average value of the oscillatory torque command value ($T^*$) can be made equivalent to the first target torque value ($T_1$). The average value of the torque command value (T*) can therefore be prevented from being offset with respect to the first target torque value ($T_1$).

As described above, in the illustrated embodiment, the torque-limiting component 13 causes the sign of the first target torque value ($T_1$) and the sign of the torque command value (T*) to be the same, and a limit is placed on the torque command value (T*) according to the first target torque value ($T_1$). When detection errors of the rotational-angle sensor 6, irregularities in the road surface, or other disturbances cause the second target torque value ($T_2$) to fluctuate, reversal of the positive or negative sign of the torque command value (T*) resulting from fluctuations in the second target torque value ($T_2$) can thereby be minimized. Also, because backlash can occur in the transmission that is at the stage subsequent to the output shaft of the motor 5, the contact direction of the gears might not be held constant, Thus, anomalous sounds may be generated due to fluctuations in the second target torque value ($T_2$). However, in the disclosed embodiment, the contact direction of the gears of the transmission is constant. Therefore, the production of anomalous sounds can be prevented by the illustrated embodiment.

Furthermore, in the illustrated embodiment, the torque-limiting component 13 sets the positive of the absolute value of the first target torque value ($T_1$) as the upper-limit value, sets the negative of the absolute value of the first target torque value ($T_1$) as the lower-limit value, and places a limit on the second target torque value ($T_2$). When the torque command value (T*) fluctuates due to detection errors in the rotational-angle sensor 6 or other issues, the torque command value (T*) can thereby be made to fluctuate in either the region of positive torque values or the region of negative torque values. Therefore, reversal of the positive or negative sign of the torque command value (T*) can be prevented. Also, the average value of the oscillatory torque command value (T*) can be made equivalent to the first target torque value ($T_1$). Therefore, the average value of the torque command value (T*) can be prevented from being offset with respect to the first target torque value ($T_1$).

Figure 9:
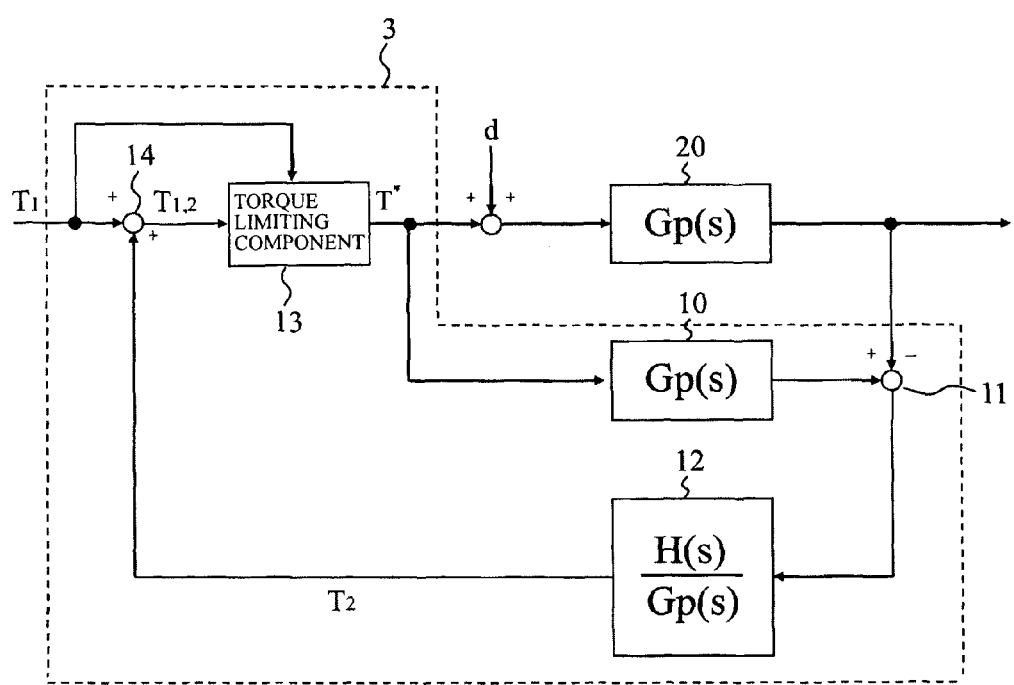
FIG. 9 is a block diagram illustrating an example of a damping control component and a control block for the motor in a motor controlling apparatus according to another embodiment.

In the embodiment described above, the torque-limiting component 13 is provided at the output side of the control block 12, and limits are placed on the second target torque value ($T_2$). However, it is also acceptable to provide the torque-limiting component 13 at the output side of the adder 14, as shown in FIG. 9. In such a configuration, the torque-limiting component 13 places limits on the target value that results from adding the first target torque value ($T_1$) and the second target torque value ($T_2$), thereby placing limits on the torque command value (T*). FIG. 9 is a block diagram that shows the damping control component 3 and the control block 20 for the motor 5 in a motor controlling apparatus according to a modified embodiment.

That is, as shown in FIG. 9, the torque-limiting component 13 receives a target torque value ($T_{1,2}$) output from the adder 14. The torque-limiting component 13 thus places a limit on the target torque value ($T_{1,2}$) according to the first target torque value ($T_1$), and outputs the torque command value (T*). That is, the adder 14 adds the first target torque value ($T_1$) and second target torque value ($T_2$), which is output from the control block 12, and outputs the target torque value ($T_{1,2}$) to the torque-limiting component 13. The torque-limiting component 13 compares the sign of the first target torque value ($T_1$) and the sign of the target torque value ($T_{1,2}$). When the sign of the first target torque value ($T_1$) and the sign of the target torque value ($T_{1,2}$) are reversed with respect to each other, the torque-limiting component 13 sets the target torque value ($T_{1,2}$) at zero and outputs this value as the torque command value (T*). On the other hand, when the sign of the first target torque value ($T_1$) and the sign of the target torque value ($T_{1,2}$) are not reversed with respect to each other, the torque-limiting component 13 does not place a limit on the target torque value ($T_{1,2}$), and outputs the target torque value ($T_{1,2}$) as the torque command value (T*). When the second target torque value ($T_2$) fluctuates due to detection errors in the rotational-angle sensor 6, irregularities in the road surface, or other disturbances, reversal of the positive or negative sign of the torque command value (T*) due to the fluctuations of the second target torque value ($T_2$) can thereby be minimized.

It should also be noted that the motor-torque-setting component 2 of the illustrated embodiment can be considered to correspond to "first-target-torque-value-calculating means." Also, the motor-torque-controlling component 4 can be considered to correspond to "motor controlling means," and the rotational-angle sensor 6 can be considered to correspond to "rotational-frequency-detecting means." The control block 12 or, alternatively, the control block 10 and the control block 12, can be considered to correspond to the "second-target-torque-value-calculating means." In addition, the adder 14 can be considered to correspond to "torque-command-value-calculating means," and the torque-limiting component 13 can be considered to correspond to the "torque-limiting means."

As can be appreciated from the above, the motor controller according to the disclosed embodiments operates so that the sign of the torque command value that is limited does not change frequently. Therefore, the contact direction of the gears of the transmission, for example, does not change frequently. Accordingly, anomalous sounds in the gears can be prevented.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms "detect" or "sense" and their variations as used herein to describe an operation or function carried out by a component, a section, a device or the like includes a component, a section, a device or the like that does not require physical detection or sensing, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A motor controlling apparatus comprising:
a first target torque value calculator configured to calculate a first target torque value based on accelerator position and motor rotational speed, the first target torque value being a target value of an output torque of a motor;
a frequency detector configured to detect a rotational frequency of the motor;
a second target torque value calculator configured to calculate a second target torque value based on the rotational frequency detected by the frequency detector;
a torque command value calculator configured to mathematically combine the first target torque value and the second target torque value by adding the first target torque value and the second target torque value together to calculate a torque command value;
a torque limiter configured to set a sign of the first target torque value and a sign of the torque command value to be equal, to set a positive of an absolute value of the first target torque value as an upper-limit value and to set a negative of the absolute value of the first target torque value as a lower-limit value to limit the torque command value according to the first target torque value, the torque limiter being further configured to limit the second target torque value and to limit the torque command value according to the second target torque value; and
a controller configured to control the motor based on the torque command value as limited by the torque limiter.

2. The motor controlling apparatus according to claim 1, wherein
the torque command value calculator is configured to produce a combined target torque value that results from mathematically combining the first target torque value and the second target torque value; and
the torque limiter is further configured to limit the combined target torque value to limit the torque command value.

3. The motor controlling apparatus according to claim 2, wherein
the torque command value calculator is configured to mathematically combine the first target torque value and the second target torque value by adding the first target torque value and the second target torque value together to produce the combined value.

4. The motor controlling apparatus according to claim 3, wherein
the torque limiter is further configured to set the target torque value to zero when the sign of the first target value and the sign of the combined value are reversed with respect to each other, the torque limiter being further configured to limit the torque command value to zero.

5. A motor controlling method comprising:
calculating a first target torque value based on accelerator position and motor rotational speed, the first target torque value being a target value of an output torque of a motor;
detecting a rotational frequency of the motor;
calculating a second target torque value based on the rotational frequency;
mathematically combining the first target torque value and the second target torque value by adding the first target torque value and the second target torque value together to calculate a torque command value;
setting a sign of the first target torque value and a sign of the torque command value to be equal to limit the torque command value to a limited toque command value according to the first target torque value;
setting a positive of an absolute value of the first target torque value as an upper limit value and setting a negative of the absolute value of the first target torque value as a lower-limit value;
limiting the second target torque value;
limiting the torque command value according to the second target torque value; and
controlling the motor based on the limited torque command value.

* * * * *